(12) United States Patent
Callaghan et al.

(10) Patent No.: US 6,478,852 B1
(45) Date of Patent: Nov. 12, 2002

(54) METHOD OF PRODUCING NITROGEN ENRICHED AIR

(75) Inventors: Kevin Patrick Callaghan, Wilmington, DE (US); Stuart Marshall Nemser, Wilmington, DE (US)

(73) Assignee: CMS Technology Holdings, Inc., Wilmington, DE (US)

( * ) Notice: Subject to any disclaimer, the term of this patent is extended or adjusted under 35 U.S.C. 154(b) by 0 days.

(21) Appl. No.: 09/506,636

(22) Filed: Feb. 18, 2000

(51) Int. Cl.$^7$ ................................................. B01D 53/22
(52) U.S. Cl. ......................................... 95/54; 96/8; 96/13
(58) Field of Search ........................... 95/45–56; 96/4, 96/8, 10, 12–14

(56) References Cited

U.S. PATENT DOCUMENTS

| | | | | |
|---|---|---|---|---|
| 3,339,341 A | * | 9/1967 | Maxwell et al. ............. | 96/8 X |
| 3,499,062 A | | 3/1970 | Geary, Jr. et al. ............ | 264/36 |
| 3,536,611 A | | 10/1970 | De Felippi et al. ........... | 210/22 |
| 4,687,578 A | | 8/1987 | Stookey ..................... | 210/321.1 |
| 4,781,907 A | * | 11/1988 | McNeill ..................... | 95/54 X |
| 4,883,023 A | * | 11/1989 | Tsang et al. ................. | 96/8 X |
| 5,051,113 A | * | 9/1991 | Nemser ..................... | 95/54 |
| 5,051,114 A | * | 9/1991 | Nemser et al. .............. | 95/54 X |
| 5,053,059 A | * | 10/1991 | Nemser ..................... | 95/54 |
| 5,084,073 A | * | 1/1992 | Prasad ...................... | 96/8 X |
| 5,147,417 A | * | 9/1992 | Nemser ..................... | 95/54 |
| 5,185,014 A | * | 2/1993 | Prasad ...................... | 95/54 |
| 5,226,932 A | | 7/1993 | Prasad ...................... | 55/16 |
| 5,240,471 A | * | 8/1993 | Barbe et al. ................. | 95/54 |
| 5,288,304 A | * | 2/1994 | Koros et al. ................. | 95/54 X |
| 5,378,263 A | | 1/1995 | Prasad ...................... | 95/54 |
| 5,388,413 A | * | 2/1995 | Major et al. ................. | 95/54 X |
| 5,500,036 A | * | 3/1996 | Kalthod ..................... | 95/54 |
| 5,588,984 A | * | 12/1996 | Verini ...................... | 95/54 X |
| 5,678,526 A | | 10/1997 | Cullen et al. ............... | 123/690 |
| 5,709,732 A | * | 1/1998 | Prasad ...................... | 95/54 X |
| 5,730,780 A | * | 3/1998 | Booth, III .................. | 95/54 X |
| 5,876,604 A | | 3/1999 | Nemser et al. .............. | 210/634 |
| 6,126,721 A | * | 10/2000 | Nemser et al. .............. | 95/54 |

* cited by examiner

Primary Examiner—Robert H. Spitzer
(74) Attorney, Agent, or Firm—Jeffrey C. Lew

(57) ABSTRACT

A membrane separation process and apparatus for carrying out the process involves contacting a gas feed mixture with one side of a selectively gas permeable membrane and allowing the components to pass through the membrane to form a permeate composition in contact with the opposite side of the membrane and leave a retentate composition on the feed side of the membrane. The process includes introducing a sweep flow of feed gas into the permeate composition near the membrane at a rate effective to increase the enrichment of the retentate composition in the less preferentially permeable component of the feed mixture to a concentration much greater than is achieved without the sweep flow. This process is especially well suited to improve single stage membrane separation effectiveness so that the need for conventional multistage separations to achieve moderate to high purity retentate compositions can be obviated. The novel process is particularly useful for providing enriched air in the concentration range of 80–90 vol. % nitrogen.

17 Claims, 9 Drawing Sheets

METHOD OF PRODUCING NITROGEN ENRICHED AIR

This invention was made with Government support under contract number 68-D6-0042 awarded by the Environmental Protection Agency. The Government has certain rights in the invention.

FIELD OF THE INVENTION

This invention relates to utilizing a gas permeable membrane to increase the concentration of a less preferentially permeable component of a mixture of gases which are selectively permeable through the membrane. More specifically, it relates to a method of increasing nitrogen concentration of air using an oxygen selectively permeable gas separation membrane.

BACKGROUND AND SUMMARY OF THE INVENTION

Using a membrane to separate components of fluid mixtures is a well developed technology of presently great commercial significance. In general, membrane separation processes involve bringing a fluid feed mixture in contact with one side of a fluid permeable membrane. The composition of the membrane is chosen, inter alia, to provide that the components of interest in the fluid mixture permeate the membrane selectively. That is, they permeate the membrane at different rates. The preferentially permeable components permeate faster than the less preferentially permeable components. Consequently, the preferentially permeable components concentrate on the side of the membrane opposite the feed mixture in a mixture often referred to as the permeate composition. The composition on the feed mixture side of the membrane becomes deficient in the preferentially permeable components, and accordingly, concentrated in the less preferentially permeable components. This product mixture is frequently designated the retentate composition.

Transmembrane flux is largely influenced by a driving force defined by a difference in physical properties between the fluids on opposite sides of the membrane. For example, in membrane separation via permeation, the driving force is the difference in partial pressures of the fluid components in the feed and permeate compositions. The property difference can diminish to lower the driving force and reduce transmembrane flux under certain conditions, such as if the preferentially permeable component is not removed from the vicinity of the permeate side of the membrane. In that event, the concentration of the preferentially permeable component builds up and increases the partial pressure in the permeate to an amount that might approach the partial pressure in the feed. Flow of the component through the membrane will reduce and ultimately stop as the partial pressure difference drops to zero.

Often a retentate composition enriched in the less preferentially permeable components is the desired product of separation. In continuous membrane separations, the components in the permeate product usually attain steady state concentrations, assuming steady feed composition, flow rates and other operating conditions. This causes the retentate mixture to also have a steady state concentration which limits the maximum purity of the less preferentially permeable components that can be obtained in a single stage separation. The steady state can be shifted to higher purity for example by changing the stage cut, i.e., the ratio of permeate flux to feed flux. However, this usually reduces the overall flow through the membrane separation unit to unacceptably low productivity levels. Consequently, single stage membrane separation is understood in the art to be normally limited to achieving only slightly increased concentrations of less preferentially permeable components. The art has primarily relied on multiple stage membrane separations to obtain very high concentrations of gas components.

A sometimes favored technique aimed at increasing the high driving force across the membrane for boosting permeation rates calls for sweeping a fluid past the permeate side of the membrane. The sweep fluid thus carries the permeate fluid away from the region adjacent to the membrane which amplifies the driving force and promotes permeation.

U.S. Pat. No. 3,536,611 discloses a device and membrane separation method primarily for concentrating liquids, for example, increasing the octane number of gasoline stocks by selectively removing low-octane components from naphtha, and removing aromatics from kerosene. In the preferred embodiments the membrane is formed of capillary tubes which are arranged in a woven mat that encircles a central distributor tube within a shell. A sweep stream is introduced so as to diffuse radially through the interstitial spaces between the tubes. A fluid different from the feed, permeate and retentate is used for the sweep.

U.S. Pat. No. 3,499,062 discloses single and multi-stage membrane separation processes for purifying diverse fluids, such as increasing oxygen enriched air, separating methane from hydrocarbons, recovering hydrogen from mixtures with other gases and repurifying helium. The '062 patent discloses use of a sweep flow which may be a portion of the inlet stream at lower pressure and moved through the permeate portion of a membrane separator in order to maintain desirable effective concentration gradients.

U.S. Pat. No. 5,226,932 discloses processes which include passing a feed gas through a membrane separator at superatmospheric pressure while passing a purge gas of either dry product or externally supplied dry gas through the permeate countercurrent to the feed gas.

U.S. Pat. No. 5,378,263 discloses multi-stage membrane systems for producing very high purity nitrogen from air, i.e., typically greater than 99%. It is taught that in some circumstances the efficiency of separation may be enhanced by using the permeate product from a third stage separation as a countercurrent purge stream for the permeate side of the first stage separation.

It would still be desirable to provide a simple and efficient membrane separation method for purifying less preferentially permeable components from gas mixtures to significantly higher concentrations than heretofore thought possible. Accordingly, there is now provided a method of increasing the concentration of a component of a gas mixture comprising providing a selectively gas permeable membrane, supplying a gaseous feed mixture comprising two components, one component being less preferentially permeable through the selectively gas permeable membrane than the other component, contacting one side of the selectively gas permeable membrane with the gas mixture, thereby causing the two components to permeate the membrane to produce a retentate gas mixture in contact with the one side of the membrane having a first enriched concentration of the less preferentially permeable component relative to the gaseous feed mixture, and a permeate gas mixture in contact with the opposite side of the membrane, and introducing into the permeate gas mixture a sweep flow of the gaseous feed mixture at a rate effective to produce a second enriched concentration of the less preferentially permeable component in the retentate gas mixture higher than the first enriched concentration in which said concentration higher than the enriched concentration is produced in a single stage membrane separation.

There is also provided according to this invention a single stage membrane separation apparatus for producing an enriched gas mixture comprising a selectively gas permeable membrane, means for supplying a gaseous feed mixture comprising two components, one component being less preferentially permeable through the selectively gas permeable membrane than the other component, means for contacting one side of the selectively gas permeable membrane with the gaseous feed mixture, and thereby causing the two components to permeate the membrane to produce a retentate gas mixture in contact with the one side of the membrane having a first enriched concentration of the less preferentially permeable component relative to the gaseous feed mixture and a permeate gas mixture in contact with the opposite side of the membrane, and means for introducing into the permeate gas mixture a sweep flow of the gaseous feed mixture at a rate effective to produce a second enriched concentration of the less preferentially permeable component in the retentate gas mixture higher than the first enriched concentration.

DETAILED DESCRIPTION

Figure 1:
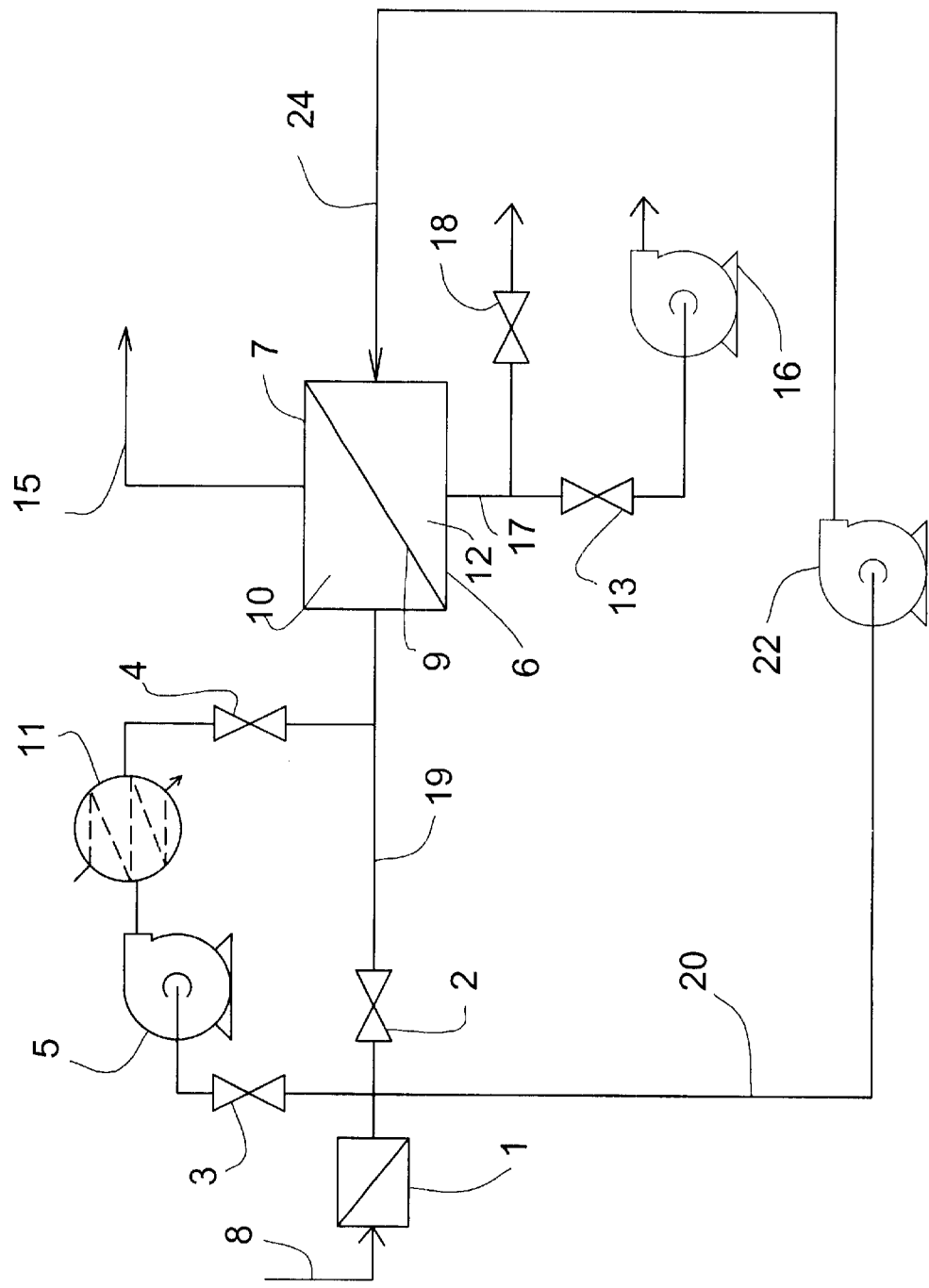
FIG. 1 is a schematic diagram of an embodiment of the novel membrane separation process.

The present invention pertains to an improved single stage membrane separation process for concentrating a less preferentially permeating component of gas mixture to a higher concentration than was previously thought possible. In a single stage membrane separation process, the feed mixture passes only once through an apparatus where it contacts one side of a membrane to which the components of the mixture are selectively permeable. The preferentially permeable components pass through the membrane faster than other components and concentrate in the permeate which is withdrawn usually at a steady rate. The retentate mixture becomes deficient in the preferentially permeable components and concentrated in less preferentially permeable components. In multiple stage processes, the permeate and/or the retentate from one membrane separation is fed to one or more additional membrane separations. Thus for example a very high purity permeate product can be obtained by feeding an already somewhat concentrated first stage permeate into another separation unit.

In the novel single stage membrane separation process the primary objective is to obtain a retentate product which is concentrated in the less preferentially permeable components. While the process also produces a permeate product that has higher concentration of the preferentially permeable components than the feed, this product is of secondary interest.

The novel membrane separation process involves the introduction of a sweep flow into the permeate gas mixture preferably in the vicinity of the permeate side of the gas permeable membrane. Importantly, the composition of the sweep flow is the same as the feed gas mixture that is initially fed to the membrane separation apparatus. The sweep flow can be generated by synthesizing a gas mixture of identical composition to the feed mixture, however, it is preferred to divert a portion of the feed gas mixture itself into the permeate. Of course, the latter technique consumes part of the feed mixture and leaves less for separation. Therefore, this method is best suited to separations in which the supply of feed is ample and/or inexpensive. For example, the novel process is ideal for obtaining nitrogen enriched air from ambient air as will be shown in greater detail below.

The sweep flow should be introduced into the permeate chamber of the membrane separation apparatus close to the membrane. The sweep flow has several effects. By virtue of its velocity, the sweep flow agitates the region near the membrane and reduces the adjacent boundary layer thickness. This layer can contain a higher concentration of the preferentially permeable component than the bulk of the permeate stream. Hence, a deep boundary layer can reduce the permeation driving force and lower the maximum concentration of less preferentially permeable component in the retentate. The sweep flow also has a lower concentration of preferentially permeable component than does the permeate. The introduction of sweep thus additionally dilutes the preferentially permeable component and thereby increases the permeation driving force. This leads to a higher maximum concentration of less preferentially permeable component in the retentate.

It has been found that introducing an adequate flow of feed composition gas into the permeate near the membrane can provide a concentration of less preferentially permeable component in the retentate that is much higher than would occur in the enriched retentate gas without the sweep. Moreover, the purity of the less preferentially permeable component in the retentate is significantly higher than the prior art had contemplated could be produced in a single stage separation.

The novel separation process advantageously can be carried out with only slight modification to conventional equipment. As seen in FIG. 1, a basic embodiment of the novel membrane separation process is characterized by feeding a gas mixture 8 through a filter 1 which contains filter elements intended to prevent particles that might be entrained in the feed mixture from entering downstream equipment. In one configuration, the flow is blown into membrane module 6 using blower 5 by opening block valves 3 and 4 and closing valve 2. Depending upon operating conditions such as flow, pressure of the feed gas at discharge of the blower, nature of the components in the mixture, composition of the gas permeable membrane and the like, it may be desirable to control the temperature of feed prior to entry into the module with an optional heat exchanger 11.

The membrane module includes a nonporous gas permeable membrane 9 the composition of which is chosen to be selectively permeable to the components of feed mixture to be separated. The membrane divides the case 7 of the module into the feed/retentate chamber 10 and the permeate chamber 12 in contact with and on opposite sides of the membrane 9. As the feed passes through the feed/retentate chamber 10 the components permeate the membrane 9 at different rates producing a permeate composition in the permeate chamber 12 which is enriched in the preferentially permeable components compared to the feed mixture, and a retentate composition in the feed/retentate chamber 10 which is enriched in the less preferentially permeable components. The retentate composition discharges from the feed/retentate chamber via transfer line 15. Permeate composition exits the module via transfer line 17 through which it can be diverted through block valve 18 to be consumed in another process or discarded.

In an alternate configuration, the feed gas can be admitted into the module through line 19 by closing valves 3 and/or 4 and opening valve 2 while drawing permeate composition from the permeate chamber with vacuum pump 16. This can be accomplished by closing valve 18 and opening valve 13 in transfer line 17.

According to the present invention, the concentration of the less preferentially permeable component can be further enriched considerably by introducing a sweep flow 24 into the permeate chamber. This is represented in the figure by drawing a portion of the feed gas mixture through transfer line 20 into blower 22.

Although the nonporous membrane can be an unsupported monolithic gas permeable membrane structure, the selectively gas permeable membrane according to this invention preferably comprises a nonporous layer of a selectively gas permeable polymer deposited on a supporting layer of a microporous substrate in which the nonporous membrane is adjacent and coextensive with the supporting porous substrate. The porous support thus provides structural integrity for the nonporous membrane.

The polymer of the nonporous layer should have both good selectivity, i.e., selectivity greater than about 1.4, and high permeability for the components to be permeated. Such a membrane material provides the ability to obtain an excellent purity of the less preferentially permeable component in the retentate at good flux while using a compact membrane module. Polymers with large free volume have been found very useful. Representative polymers include polytrimethylsilylpropyne, silicone rubber, and certain amorphous copolymers of perfluoro-2,2-dimethyl-1,3-dioxole ("PDD"). Copolymers of PDD are particularly preferred in that they have a unique combination of superior permeability and selectivity for a variety of gas mixtures. Moreover, such PDD copolymers are amenable to forming thin layers on microporous substrates to provide very high transmembrane flow rates.

In some preferred embodiments, the copolymer is copolymerized PDD and at least one monomer selected from the group consisting of tetrafluoroethylene ("TFE"), perfluoromethyl vinyl ether, vinylidene fluoride, hexafluoropropylene and chlorotrifluoroethylene. In other preferred embodiments, the copolymer is a dipolymer of PDD and a complementary amount of TFE, especially such a polymer containing 50–95 mole % of PDD. Examples of dipolymers are described in further detail in U.S. Pat. No. 4,754,009 of E. N. Squire, which issued on Jun. 28, 1988; and U.S. Pat. No. 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all of these U.S. patents are hereby incorporated herein by reference.

The amorphous copolymer can be characterized by its glass transition temperature which will depend on the composition of the specific copolymer of the membrane, especially the amount of TFE or other comonomer that may be present. Examples of Tg are shown in FIG. 1 of the aforementioned U.S. Pat. No. 4,754,009 of E. N. Squire as ranging from about 260° C. for dipolymers with 15% tetrafluoroethylene comonomer down to less than 100° C. for the dipolymers containing at least 60 mole % tetrafluoroethylene.

It is desirable to determine that the gas permeable membrane is nonporous. Absence of porosity can be measured by various methods known in the art, including for example, microscopic inspection of the membrane surface. PDD copolymers are particularly advantageous in this regard because they are intrinsically selectively gas permeable to a variety of gases. Specifically, nonporous membranes of PDD copolymers exhibit an oxygen/nitrogen gas selectivity of greater than about 1.4. Hence it is possible to measure the difference in flux rates of two gases, for example oxygen and nitrogen, through a PDD copolymer membrane to verify that it is selectively gas permeable, and therefore, intact and nonporous over the membrane surface.

The porous substrate can be selected from many available porous and microporous materials known in the art such as perforated sheet, porous woven or nonwoven fabric, and microporous polymer film. The substrate composition should be inert to the components of the feed gas mixture. Additionally, it should be suitable for forming into a desired membrane shape. The pore size of the porous or microporous substrate is not particularly critical provided that the porous matrix can adequately support the nonporous membrane over the expanse of the gas transfer area. Preferably, microporous substrates should have a pore size of about 0.005 –1.0 $\mu$m. Representative porous substrate materials include polyolefins, such as polyethylene and polypropylene, polytetrafluoroethylene, polysulfone, and polyvinylidene fluoride, and other compositions such as polyethersulfone, polyamide, polyimide, cellulose acetate and cellulose nitrate.

The nonporous gas permeable membrane and the microporous support can be layered without bonding between the layers, however, it is preferred that some type of bonding exists. For example, the layers can be tacked mechanically, or preferably glued together thermally or with an adhesive. In a particularly preferred embodiment, the nonporous layer is formed in situ by coating a side of the microporous substrate.

The shape of the selectively gas permeable membrane can be selected from a diverse variety of forms such as a sheet which can be flat, pleated or rolled into a spiral to increase the surface to volume ratio of the separation unit. The membrane can also be in tube or tube ribbon form. Membrane tubes and tube ribbons are disclosed in U.S. Pat. No. 5,565,166 which is incorporated herein by reference.

In a particularly preferred embodiment, the selectively gas permeable membrane for use according to this invention is applied as a thin layer on a support of a microporous hollow fiber. Such composite hollow fibers beneficially provide a very large surface area per unit of membrane structure volume and thus are able to produce extremely high gas flux in small occupied space. This surface to volume ratio benefit can be exploited further by assembling a plurality of composite hollow fibers in a multifiber membrane module. Such module typically includes a bundle of many hollow fibers in substantially parallel alignment. The ends of the fibers are potted in a fixation medium, for example an epoxy resin. The bundle is then sliced through the potted ends and the bundles can be mounted within a casing to form a shell and tube modular unit. Fabrication of multifiber membrane modules is disclosed in aforementioned U.S. Pat. Nos. 3,536,611 and 3,499,062, which disclosures are hereby incorporated by reference herein.

The nonporous membrane can be formed on the hollow fibers before bundling and assembling the module or it can be formed on the fibers in situ after installing them within a module. U.S. Pat. No. 5,914,154 of Stuart M. Nemser, the disclosure of which is incorporated herein by reference in its entirety, discloses especially effective methods to produce such nonporous membrane covered hollow fiber modules.

Figure 2:
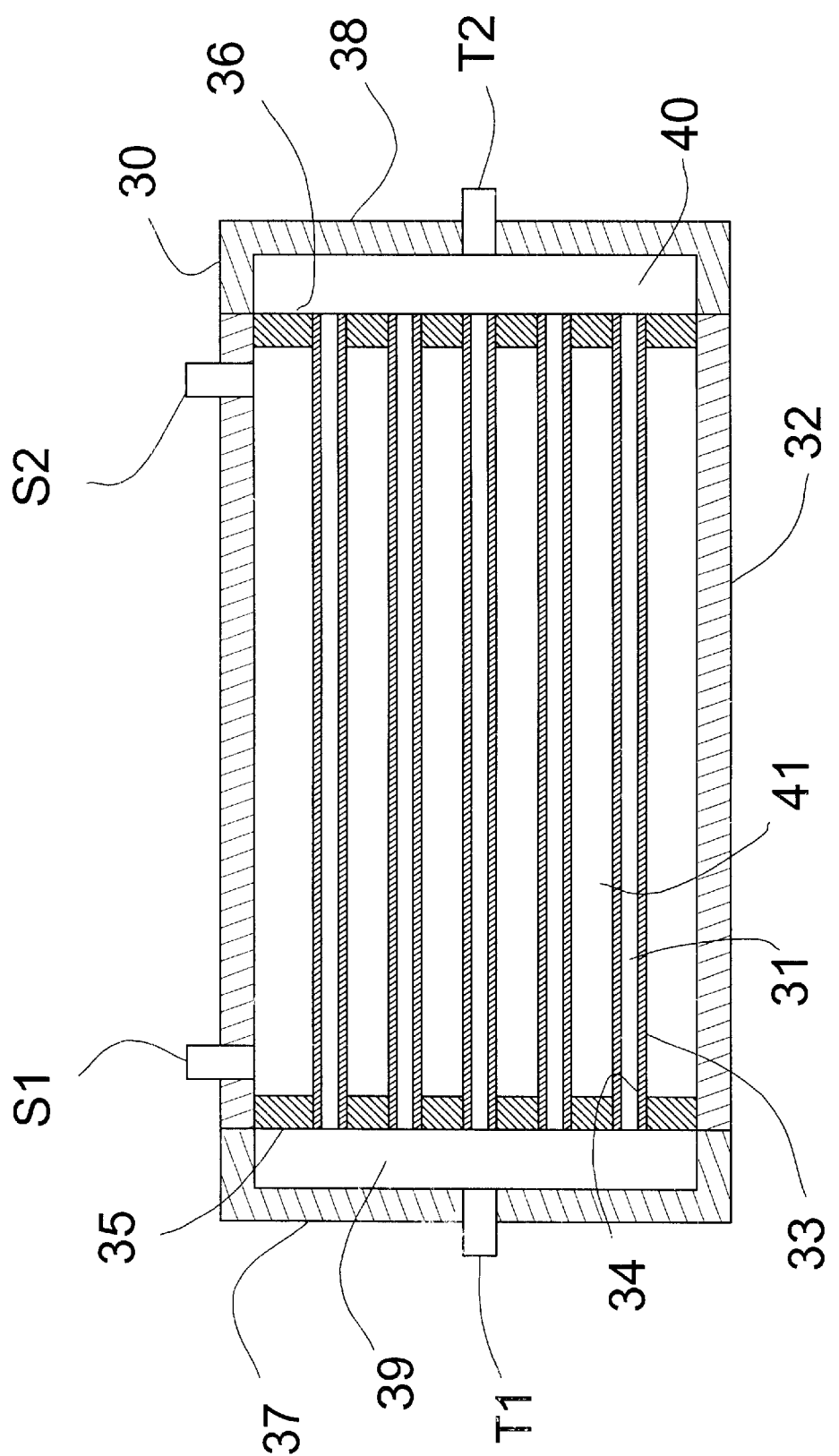
FIG. 2 is a section view of a hollow fiber module adapted to carry out a membrane separation process according to the present invention.

Several aspects of the novel membrane separation process can be understood from FIG. 2 which shows a section view of a multifiber hollow fiber membrane module 30. The module has an elongated, preferably cylindrical shell 32 within which are positioned a plurality of microporous hollow fibers 33 in substantially parallel alignment to the longitudinal axis of the module. The fibers are potted at the ends 35, 36. The lumina 31 of the hollow fibers 33 together with zones 39, 40 within end caps 37, 38 enclose a volume of space occasionally referred to as "the tube side" of the module. Ports T1 and T2 provide means for transporting gas to or from zones 39 and 40, respectively, and by virtue of the connection between these zones by the lumina 31, the ports are in fluid communication with each other. The zone 41 on the opposite side of the hollow fiber membranes, occasionally referred to as "the shell side", of the module, is defined by the space surrounding the fibers between end caps 35 and 36 and within shell 32. Ports S1 and S2 are provided to permit transfer of gas to and from zone 41.

FIG. 2 will now be further explained on the basis that permeation occurs in the direction from inside the fibers to outside the fibers, although configuration of the module to carry out permeation in the reverse direction, i.e., from outside to inside, is also contemplated. The fibers have a nonporous layer 34 of a selectively permeable polymer covering the surfaces of lumina 31. Feed gas mixture is caused to enter zone 39 via port T1. In zone 39 the mixture composition remains the same as the feed. As the gas passes through the fiber lumina, selective permeation takes place which produces in zone 40 a retentate product composition that is rich in the less preferentially permeable component than the feed. The product leaves zone 40 through port T2.

Permeate byproduct can discharge from zone 41 through either one or the other of ports S1 and S2. FIG. 2 has been drawn to indicate that these shell side ports are located near the ends of the permeate zone which promotes either countercurrent or cocurrent permeate flow, depending upon which shell side port is selected for discharge. For example, when port S1 is employed for discharge, the bulk of the permeate byproduct must flow countercurrent to the direction of flow of the feed gas in order to exit through the port. Conversely, when discharge is through S2, the permeate largely flows cocurrently to the feed gas.

The second shell side port is used according to this invention to admit the sweep flow. Hence, in countercurrent permeate operation, sweep flow is introduced via port S2. Similarly, the sweep is introduced through port S1 to accomplish cocurrent operation.

The sweep flow can be introduced into the permeate zone 41 under pressure or aspiration. In the former, the supply of sweep gas is compressed to a pressure higher than the pressure of the permeate zone 41. This causes the sweep to be blown into the permeate. In the latter, the sweep gas preferably is supplied at about the same pressure as that of the permeate zone and an aspiration source, such as a vacuum pump, is utilized to draw the permeate gas from zone 41 at a rate greater than gas permeates the membrane. This creates a vacuum condition in the permeate zone which draws sweep gas into the shell side 41 of the module.

Four modes of effecting sweep flow have been identified as being very useful. These include countercurrent aspiration, cocurrent aspiration, cocurrent compression, and countercurrent compression. Countercurrent aspiration is preferred.

This invention is now illustrated by examples of certain representative embodiments thereof, wherein all parts, proportions and percentages are by weight unless otherwise indicated.

EXAMPLES

Example 1

Using proprietary computer mathematical modeling software, single stage separation of air was calculated based on the following conditions:

| | |
|---|---|
| Separation module: | configuration as in FIG. 2 |
| module diameter | 7.62 cm |
| separation medium | |
| substrate | microporous polysulfone hollow fibers |
| membrane | nonporous layer of a copolymer of 65 mole % PDD and 35 mole % TFE |
| membrane thickness | 0.15 μm |
| active fiber length | 76.2 cm |
| number of fibers | about 2543 |
| fiber packing density | 53% |
| fiber outer diameter | 1.1 mm |
| fiber inner diameter | 0.8 mm |
| oxygen/nitrogen selectivity | 2.50 |

-continued

| Conditions | |
|---|---|
| Feed composition | air (20.95 vol. % oxygen, 79.05 vol. % nitrogen) |
| Feed pressure at port T1 | 239 kPa absolute |
| Sweep composition | air (20.95 vol. % oxygen, 79.05 vol. % nitrogen) |
| Sweep pressure at port S2 | atmospheric pressure (101 kPa absolute) |
| Temperature | 25° C. |

The effect of sweep flow rate at three stage cut values were calculated and results are shown in Table I.

Table I indicates that sweep flow significantly improves the enrichment of separations which provide less than about 90% nitrogen enriched air absent sweep. For example, at

TABLE I

| | Nitrogen in Retentate (vol. %) | | |
|---|---|---|---|
| Sweep flow % of Feed | Stage Cut 0.25 | Stage Cut 0.50 | Stage Cut 0.85 |
| 0 | 81.62 | 85.3.3 | 94.54 |
| 10 | 82.27 | 85.71 | 90.55 |
| 20 | 82.59 | 85.90 | 89.48 |
| 30 | 82.77 | 86.00 | 89.00 |
| 40 | 82.89 | 86.05 | 88.72 |
| 50 | 82.97 | 86.09 | |
| 60 | 83.03 | 86.11 | |
| 70 | 83.07 | 86.13 | |
| 80 | 83.10 | 86.13 | |
| 90 | 83.13 | 86.14 | |
| 100 | 83.15 | 86.14 | |
| 125 | 83.19 | 86.13 | |
| 150 | 83.20 | 86.11 | |
| 175 | 83.21 | | |
| 200 | 83.22 | | |

0.25 stage cut, as low as 10% sweep flow increases the incremental nitrogen enrichment over feed air by 25.3% from 81.62 vol. % to 82.27 vol. %. At 200% sweep flow the incremental improvement is 61.9%. Incremental improvements at the 0.50 stage cut condition are smaller but still significant from a low of 6.0 to a high of 12.9%. At high stage cut, the sweep produces a 25.8% incremental loss from 10% sweep to a 37.6% incremental loss at 40% sweep. This example shows that sweep has potential to substantially increase purity of the less preferentially permeable component in a single stage, low-to-moderate stage cut, low selectivity membrane separation process. Good performance at low stage cut is desirable because it permits operation at lower pump/blower speed than high stage cuts. The ability to enhance enrichment with low selectivity membranes is also advantageous because such membranes typically exhibit higher permeance, and therefore, superior productivity. Consequently this invention allows smaller modules with less membrane area to be used.

EXAMPLE 2

Using a mathematical model, the effect of sweep flow on gas separation was studied. Calculations were based on the same process parameters as Example 1 except as follows:

| | |
|---|---|
| Separation module: | configuration as in FIG. 2 |
| module diameter | 17.8 cm |
| separation medium | |
| substrate | microporous polysulfone hollow fibers |
| membrane | nonporous layer of a copolymer of 65 mole % PDD and 35 mole % TFE |
| number of fibers | about 79,030 |
| fiber packing density | 40% |
| fiber outer diameter | 0.4 mm |
| fiber inner diameter | 0.3 mm |
| oxygen/nitrogen selectivity | 5.0 |

Results of the model studies are shown in Table II.

TABLE II

| | Stage Cut 0.05 | | Stage Cut 0.10 | | Stage Cut 0.25 | | Stage Cut 0.50 | |
|---|---|---|---|---|---|---|---|---|
| Sweep flow, % of Feed | Retentate $N_2$ vol. % | T2-T1 $\Delta P$ Pa | Retentate $N_2$ vol. % | T2-T1 $\Delta P$ Pa | Retentate $N_2$ vol. % | T2-T1 $\Delta P$ Pa | Retentate $N_2$ vol. % | T2-T1 $\Delta P$ Pa |
| 0 | 79.81 | 68.9 | 80.62 | 68.9 | 83.38 | 68.9 | 89.4 | 68.9 |
| 25 | 80.94 | 758 | 82.36 | 414 | 85.64 | 207 | 89.60 | 138 |
| 50 | 81.08 | 1448 | 82.69 | 758 | 86.25 | 345 | 89.75 | 207 |
| 75 | 81.13 | 2068 | 82.82 | 1103 | 86.50 | 483 | 89.70 | 276 |
| 100 | 81.15 | 2758 | 82.90 | 1448 | 86.64 | 620 | 89.66 | 345 |
| 125 | 81.16 | 3447 | 82.94 | 1793 | 86.72 | 758 | 89.63 | 414 |
| 150 | 81.17 | 4068 | 82.97 | 2137 | 86.78 | 896 | 89.61 | 483 |
| 175 | 81.17 | 4757 | 82.99 | 2482 | 86.82 | 1034 | 89.60 | 552 |
| 200 | 81.17 | 5378 | 82.99 | 2827 | 86.82 | 1172 | 89.58 | 620 |

This example also shows that addition of a feed gas sweep flow to a single stage membrane separation is effective to increase the nitrogen purity of the retentate at sweep flow-to-feed flow values below 75% and below 0.50 stage cut for membranes of high selectivity.

Examples 3–6 and Comparative Example 1

Figure 3:
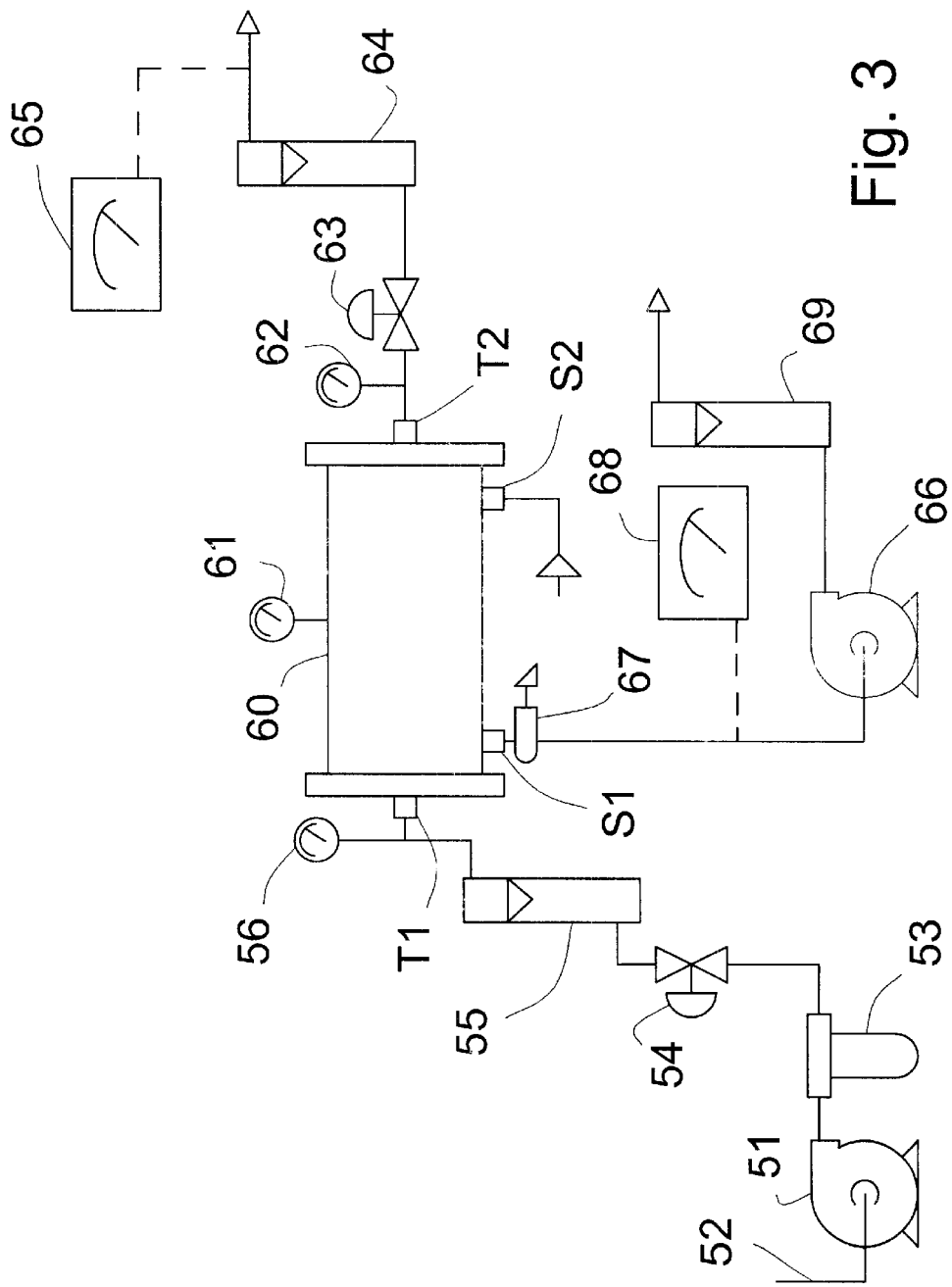
FIG. 3 is a schematic diagram of a membrane separation apparatus utilizing a multiple hollow fiber membrane module adapted to operate an embodiment of the novel process in a countercurrent aspiration mode.

In these examples, a gas separation system was set up as shown in FIGS. 3–6. Referring to FIG. 3, ambient atmospheric air was taken into air compressor 51 through transfer line 52. This air was compressed then dried in dryer 53. Pressure regulator 54 was adjusted to maintain a desired pressure of air fed to membrane module 60 as indicated by pressure gauge 56. Feed air flow to membrane module 60 was measured by flowmeter 55. Although shown symbolically as a rotameter, each of the flow meters utilized in the various examples was either a rotameter type or a positive displacement vane type gas flow meter.

The membrane module 60 was a cylindrical shell and tube type as illustrated in FIG. 2. The module had 2340 hollow fibers of 0.8 mm inner diameter, 0.3 mm wall thickness, and 25.4 cm length. The fiber lumina were coated to a thickness of about 0.83 $\mu$m with an oxygen/nitrogen selectively gas permeable composition of an 87 mol % PDD/13 mol % TFE copolymer. Prior to operation, pure oxygen and pure nitrogen were separately fed to the module and the rates of permeation were measured independently to be 2,485 gas permeation units (GPU) oxygen and 1,322 GPU nitrogen. Hence, the oxygen/nitrogen selectivity of the module was 1.88.

Feed air was admitted to the tube side of module 60 through port T1 and was discharged through port T2 where discharge pressure was measured on pressure gauge 62. Retentate air flow was controlled at the discharge by control valve 63 to obtain a desired flow indicated by flow meter 64. Prior to exhausting to atmosphere, the oxygen concentration of the retentate air was measured by the paramagnetic susceptibility method using a Servomex Model 570A oxygen analyzer 65. Pressure of the shell side permeate was measured by pressure gauge 61 placed midway along the length of the elongated module shell.

The system was operated in countercurrent aspiration mode according to the following procedure (Ex. 3). Oxygen enriched permeate air was withdrawn from the shell side through port S1 positioned at the feed end (i.e., near feed port T1) by vacuum pump 66. Temperature of permeate air was measured close to port S1 with thermometer 67. Oxygen concentration and flow of the permeate was measured by oxygen analyzer 68 and flow meter 69, respectively. Ambient atmospheric sweep air was admitted into the shell side through a 1.27 cm diameter opening in port S2 positioned at the retentate end (i.e., near retentate port T2).

Compressor 51 was started and pressure regulator 54 was adjusted to maintain about 20 psig of air feed to the membrane module tubes. Vacuum pump 66 was started and flow control valve 63 was adjusted to obtain a stable nominal stage cut of about 10%, 25%, 50% or 90%. Permeate flow was determined by subtracting retentate flow measured by instrument 64 from feed flow measured by instrument 55. Then actual stage cut, that is the permeate fraction of feed flow was calculated by dividing permeate flow by feed flow. Pressures, temperatures, flows and stream concentrations indicated by system instruments were recorded. Pressure drop across the tubes was calculated by subtracting retentate pressure of 62 from feed pressure of 56. A pressure ratio parameter defined as the average of feed and retentate pressures 62 and 56 divided by the shell side pressure 61. Raw flow rate measurements were converted to standard temperature and pressure condition values (i.e., at 60° F. and 1 atm). Sweep air flow was determined by subtracting permeate flow from shell side exhaust flow 69. The procedure was repeated with port S2 closed (Comp. Ex. 1).

Figure 4:
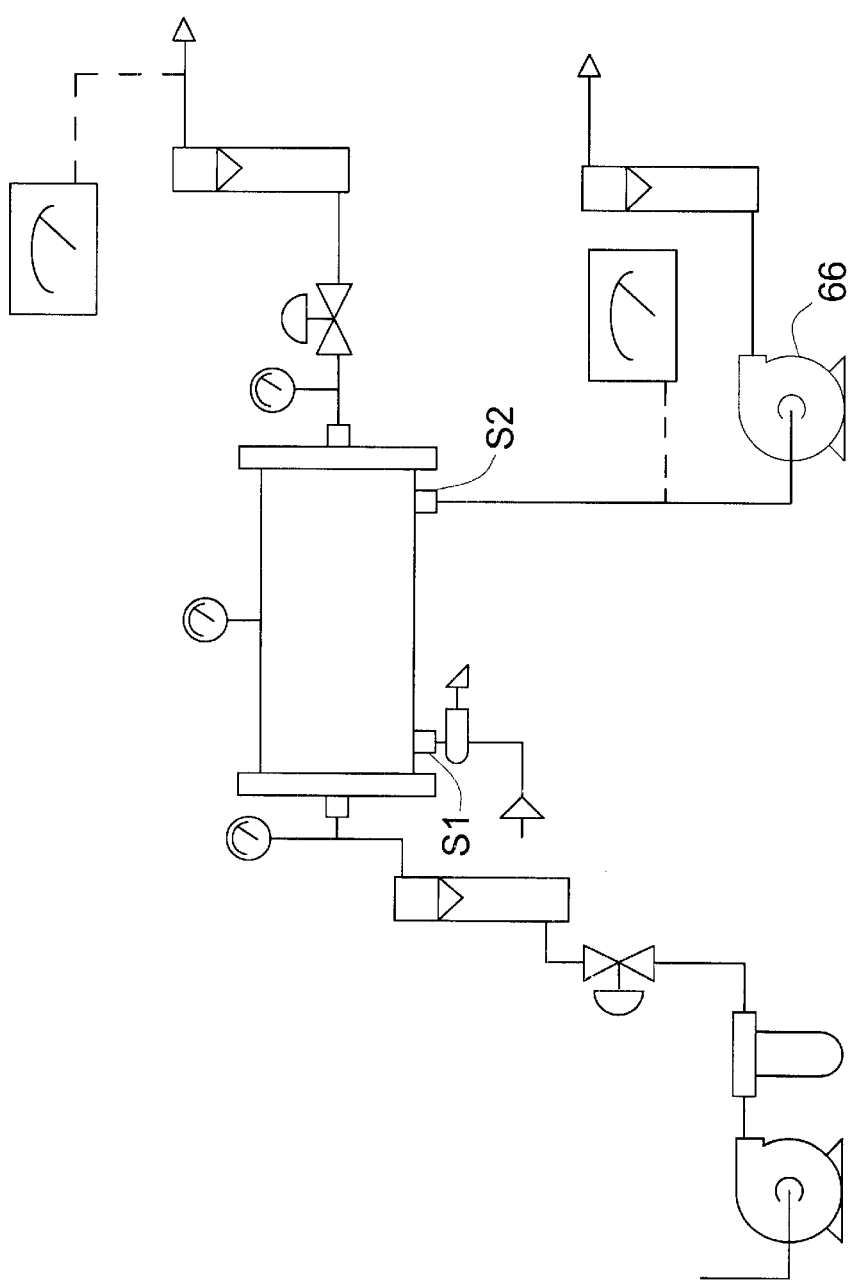
FIG. 4 is a schematic diagram of a membrane separation apparatus utilizing a multiple hollow fiber membrane module adapted to operate an embodiment of the novel process in a cocurrent aspiration mode.
Figure 5:
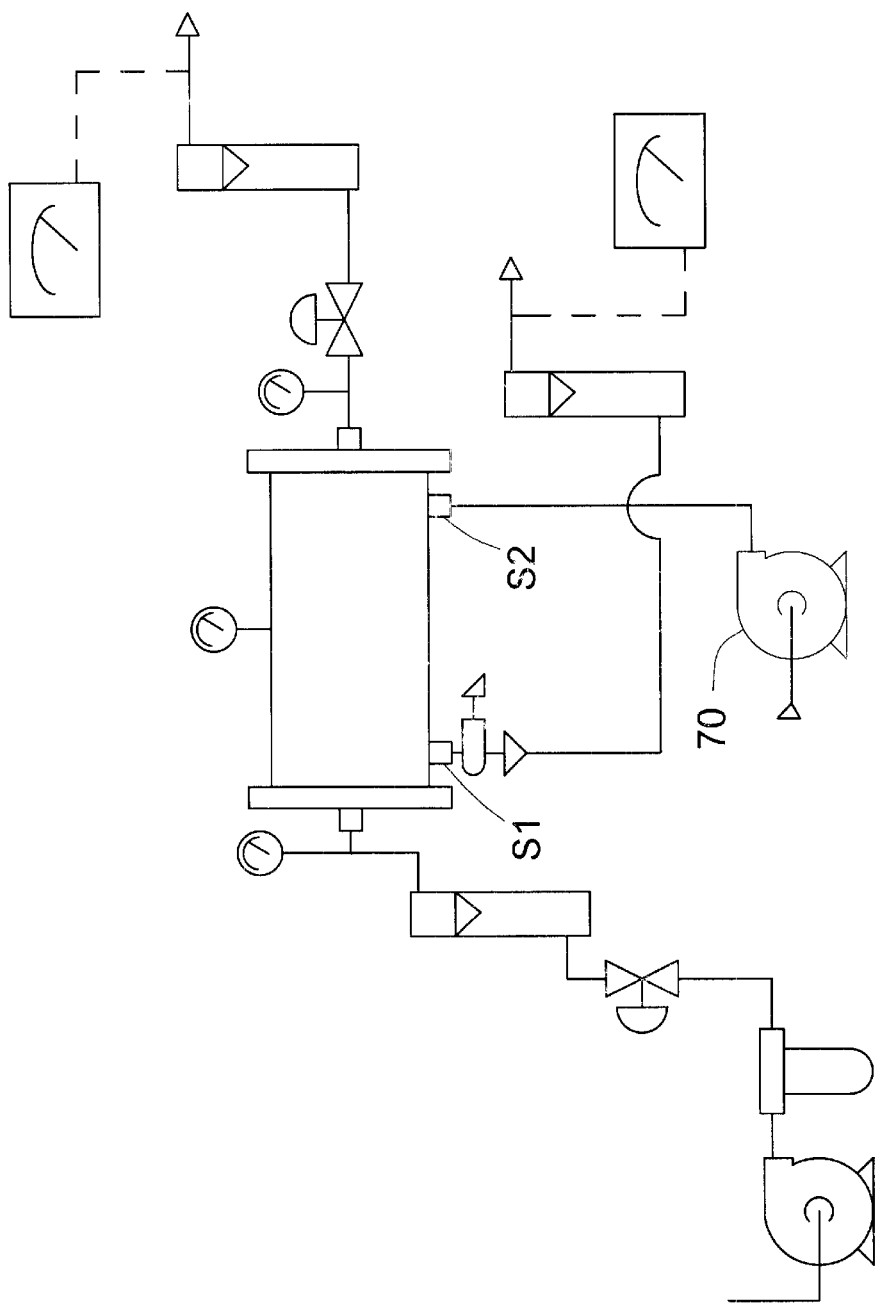
FIG. 5 is a schematic diagram of a membrane separation apparatus utilizing a multiple hollow fiber membrane module adapted to operate an embodiment of the novel process in a countercurrent compression mode.
Figure 6:
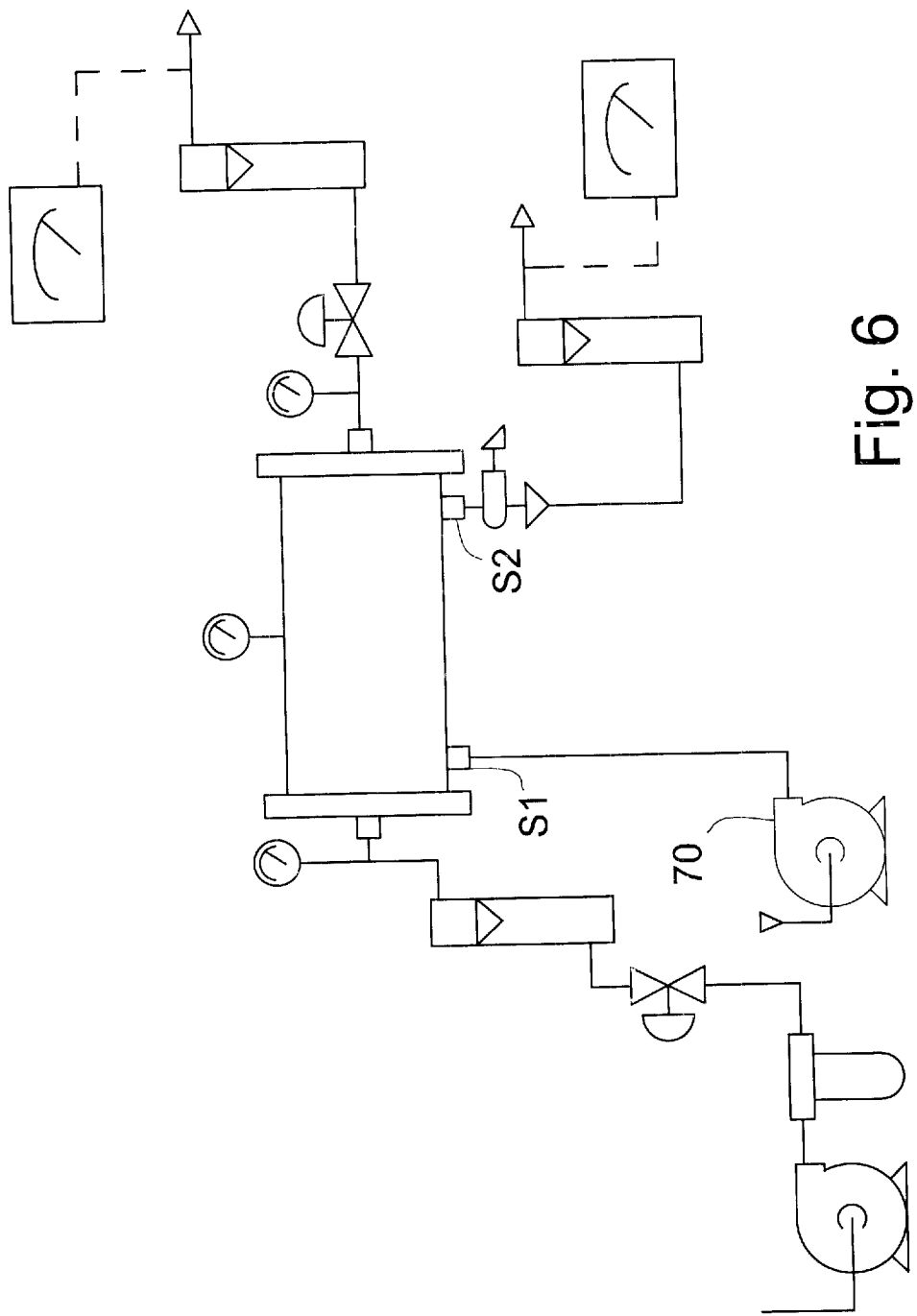
FIG. 6 is a schematic diagram of a membrane separation apparatus utilizing a multiple hollow fiber membrane module adapted to operate an embodiment of the novel process in a cocurrent compression mode.

The procedure of Ex. 3 was repeated but with the system modified to operate in cocurrent aspiration mode (Ex. 4). As shown in FIG. 4, the vacuum pump 66 was positioned at port S2 and sweep air was admitted through port S1. Temperature of the shell side was measured at S1. Similarly, the procedure was repeated as shown in FIGS. 5 and 6 (Exs. 5 and 6, respectively) with the system configured for operation in countercurrent compression mode (Ex. 5) and cocurrent compression mode (Ex. 6). As seen in the figures, a blower 70 blew ambient air into port S2 (countercurrent operation) or S1 (cocurrent operation). Recorded data and resulting calculated parameters for Exs. 3–6 and Comp. Ex. 1 are presented in Table III. Tabulated values for retentate nitrogen concentration were calculated by subtracting the oxygen concentration measured by instrument 65 from 100 vol. %.

Comparison of Exs. 5 and 6 to the control and to Exs. 3 and 4 is somewhat hindered by the difference of pressure ratio obtained in these tests (i.e., about 2.15 in the former vs. about 2.35 in the latter). Had pressure ratio of the compression mode examples been controlled more closely to that of the aspiration mode examples it is expected that more improved nitrogen enrichment of the retentate would have been observed. Nevertheless, given the variability among experimental conditions these examples show that sweep flow universally improved the nitrogen enrichment of the retentate stream significantly relative to the non-sweep flow process. Furthermore, the nitrogen enrichment of the retentate under non-sweep conditions increased only slightly as stage cut was raised from nominally 10% to 90%. In contrast, the sweep flow processes each showed steady climb of nitrogen concentration in the retentate as the stage cut increased. The largest improvement was demonstrated in counterflow aspiration Example 3. Sweep flow was able to boost nitrogen enrichment to 85.9–87.6 vol. % which was several tenths of vol. % above the non-sweep process and thus represents a significant practical improvement over the nitrogen enrichment capability of the non-sweep flow process in typical utilities.

Examples 7–10 and Comparative Example 2

The procedures of Examples 3–6 were repeated with the same respective system configurations shown in FIGS. 3–6 except that a membrane module with an oxygen/nitrogen selectivity of 2.63 was used. The module had 2340 hollow fibers of 0.8 mm inner diameter, 0.3 mm wall thickness, and 71.1 cm length. The fiber lumina were coated to a thickness of about 0.34 $\mu$m with an oxygen/nitrogen selectively gas permeable composition of 65 mol % PDD/35 mol % TFE copolymer. Pure oxygen and pure nitrogen permeation rates were independently determined to be 908 GPU and 345 GPU, respectively.

Results of these examples are presented in Table IV. Generally, the retentate nitrogen concentrations for Comp. Ex. 2 and Exs. 7–10 were each greater than those of corresponding Comp. Ex. 1 and Exs. 3–6 at each stage cut. For example, compare 83.2 vol. % nitrogen of Ex. 7 at 0.263 stage cut with 81.9 vol. % of Ex. 3 at 0.270 stage cut. This result is attributable to the difference in oxygen/nitrogen selectivities of the modules used in the groups of examples. With respect to the current group of examples, each of the retentate nitrogen values of the swept examples was higher than unswept Comp. Ex. 2 at corresponding stage cuts below about 0.90. The most improved nitrogen concentrations were observed in Ex. 7 which was operated in countercurrent aspiration mode. At stage cuts of about 0.90 retentate nitrogen concentration performance was about equal to the control.

Examples 11–14 and Comparative Example 3

The procedures of the previous groups of examples was repeated except that a membrane module with an oxygen/nitrogen selectivity of 3.8 was used. The module had asymmetric polysulfone hollow fibers, in which the separating membrane is polysulfone (product of Permea, St. Louis, Mo.) of about 0.2 mm inner diameter and 30.5 cm length.

Data from these examples are shown in Table V. Due to accuracy limitations of the flow meter used, the examples could not be operated at about 0.90 stage cut. Compared to previous groups of examples at corresponding stage cuts, the higher oxygen/nitrogen selectivity of the membrane module provided higher retentate nitrogen concentrations. Importantly with respect to this invention, the retentate nitrogen concentrations obtained with a sweeping flow were substantially higher than those obtained at similar stage cut without a sweep flow.

Figure 7:
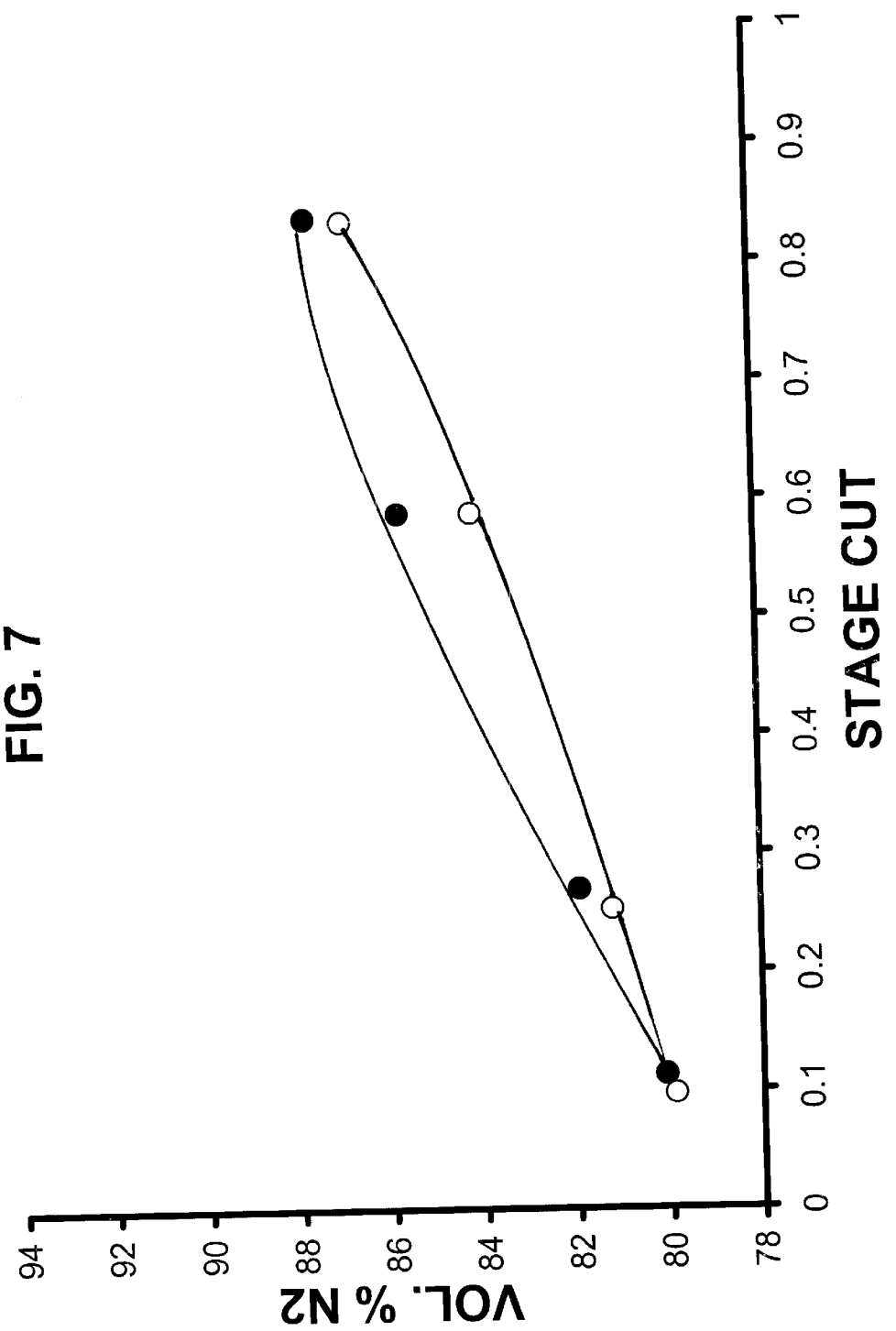
FIG. 7 is a plot of vol. % nitrogen in retentate gas as a function of stage cut obtained by separating air according to the novel process with an apparatus configured as in FIG. 3 which utilized a membrane separation module having an oxygen/nitrogen selectivity of 1.88.
Figure 8:
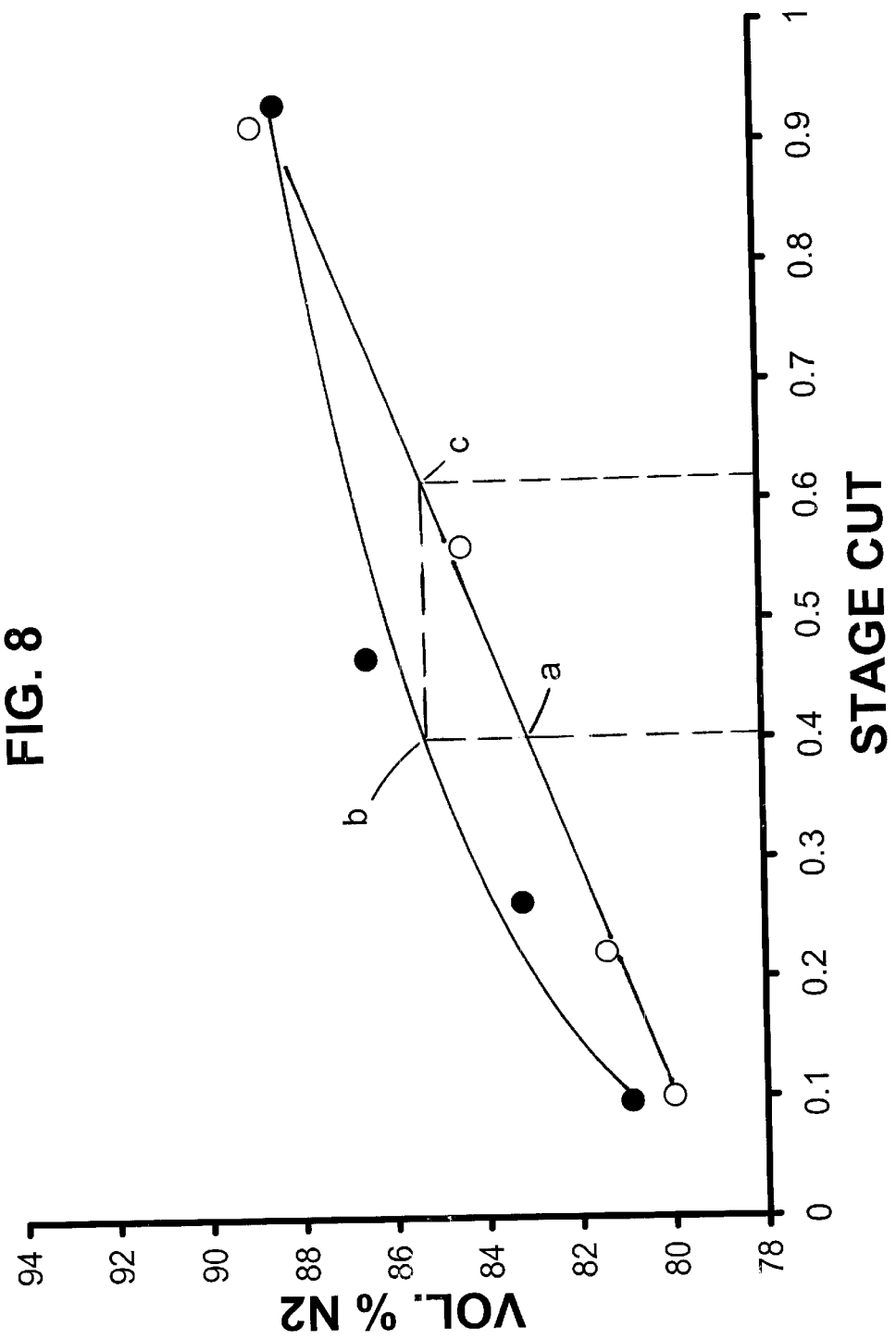
FIG. 8 is a plot of vol. % nitrogen in retentate gas as a function of stage cut obtained by separating air according to the novel process with an apparatus configured as in FIG. 3 which utilized a membrane separation module having an oxygen/nitrogen selectivity of 2.63.
Figure 9:
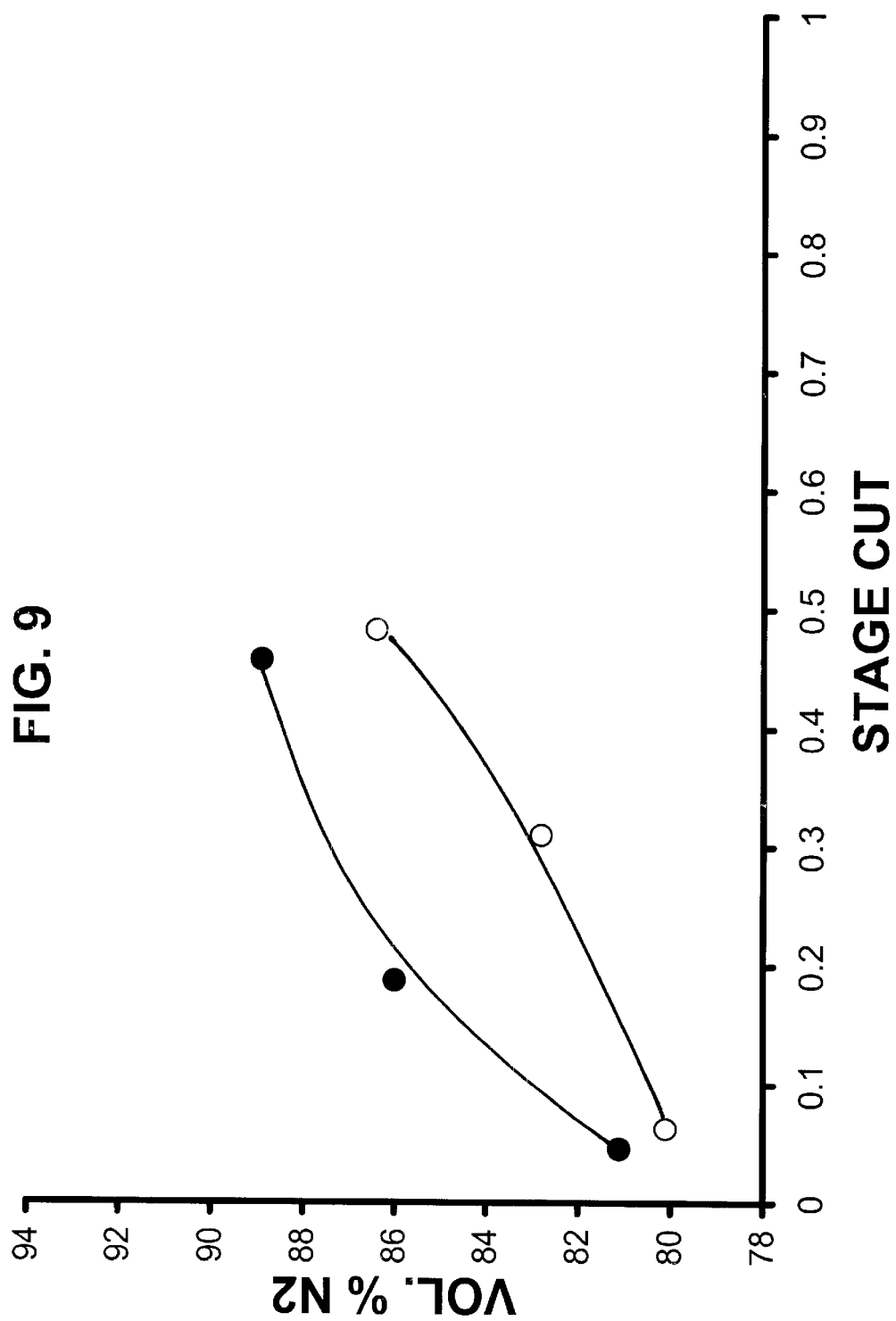
FIG. 9 is a plot of vol. % nitrogen in retentate gas as a function of stage cut obtained by separating air according to the novel process with an apparatus configured as in FIG. 3 which utilized a membrane separation module having an oxygen/nitrogen selectivity of 3.8.

Plots of retentate volume percent nitrogen against stage cut for countercurrent aspiration sweep flow Examples 3, 7, and 11 are shown in FIGS. 7–9 respectively with data points represented by filled circles. The same data obtained for non-sweep flow utilizing corresponding membrane modules, i.e., Comp. Exs. 3–6, respectively, are shown in these Figs. as empty circles. These plots show that between about 80 and 90 vol. % nitrogen in retentate, sweep flow provides substantially higher nitrogen enrichment at the same stage cut than does non-sweep flow operation in a single stage membrane module separation. For example, with reference to FIG. 8 in which the oxygen/nitrogen selectivity is 2.83, it is seen that a 0.4 stage cut without sweep generates retentate of only 83 vol. % nitrogen (point a) while sweep generates 84.5 vol. % nitrogen (point b). Viewed another way, the non-sweep flow membrane module separation would require to operate at a stage cut of 0.61 to provide the same 84.5 vol. % nitrogen (point c). This represents a dramatic reduction in productivity because for each 100 standard cubic feet per minute ("scfm") of feed gas, a 0.4 stage cut separation produces 60 scfm of retentate and a 0.61 stage cut produces only 39 scfm of retentate.

The novel process generally can be used to obtain a composition enriched in a less preferentially permeable component of a gas mixture. It is especially useful for obtaining nitrogen enriched air in the range of 80–90 vol. % nitrogen. This attribute has great value in many utilities, such as feeding combustion air to internal combustion engines, especially diesel engines, to reduce environmentally undesirable exhaust gas byproducts such as nitrogen oxides. Other utilities for this invention include providing an inert atmosphere for fuel tanks and food storage containers and for blanketing agricultural product bins and silos, among other things, for vermin control.

Although specific forms of the invention have been selected for illustration in the drawings and the preceding description and examples are drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. For example, in the preceding examples, the shell side ports S1 and S2 were aligned at the 6 o'clock position as viewed along the axis of the cylindrical module. In another embodiment, these ports can be aligned 180° relative to each other, e.g., one at the 6 o'clock and the other at the 12 o'clock positions or at other relative angular offsets. Another contemplated variation calls for a hollow fiber module in which the fibers are not aligned substantially parallel with the axis of elongation of the module. For example, the fibers can be wound in a spiral path along and around the axis. In yet another contemplated embodiment, the shell side can have a port concentric with the axis which protrudes from an end of the module and extends axially in the form of a perforated tube into and surrounded by the bundle of hollow fibers. Preferably in this embodiment, the fiber bundle is wrapped in an outer cylinder of non-gas permeable film which serves as a baffle to direct gas flowing from the central perforated tube over the length of the fiber bundle.

TABLE III

| | | Pressure | | | | | Flow | | | | Concentration | |
| --- | --- | --- | --- | --- | --- | --- | --- | --- | --- | --- | --- | --- |
| $O_2/N_2$ Selectivity | Stage Cut | Feed (psig) | Retentate (psig) | Tube Drop (psig) | Shell (inches) water) | Pressure Ratio | Feed (scfm) | Retentate (scfm) | Total Shell (scfm) | Permeate (scfm) | Shell Temp. (° F.) | Permeate Oxygen (vol. %) | Retentate Nitrogen (vol. %) |
| | | | | | | | | Drawing Ref. No. | | | | | |
| 1.88 | | 56 | 62 | | 61 | | 55 | 64 | 69 | | 67 | 68 | 65 |
| Comp Ex. 1 | 0.097 | 20 | 19.2 | 0.80 | 1.8 | 2.32 | 41.2 | 37.2 | — | 4.0 | 65 | 27.0 | 79.9 |
| | 0.253 | 20 | 19.5 | 0.50 | 2 | 2.33 | 17.4 | 13 | — | 4.4 | 69 | 25.1 | 81.2 |
| | 0.588 | 20 | 19.8 | 0.20 | 2 | 2.34 | 8.5 | 3.5 | — | 5.0 | 72 | 22.7 | 84.1 |
| | 0.835 | 20 | 19.9 | 0.10 | 1.8 | 2.35 | 6.3 | 1.04 | — | 5.3 | 71 | 26.0 | 86.8 |
| Ex. 3 | 0.113 | 20 | 19.2 | 0.80 | −10.00 | 2.39 | 42.3 | 37.5 | 15.8 | 4.8 | 65 | 21.0 | 80.1 |
| | 0.270 | 19.9 | 19.4 | 0.50 | −10.00 | 2.39 | 17.4 | 12.7 | 14.2 | 4.7 | 73 | 21.1 | 81.9 |
| | 0.588 | 19.8 | 19.7 | 0.10 | −7.00 | 2.38 | 8.5 | 3.5 | 11.5 | 5.0 | 73 | 21.1 | 85.1 |
| | 0.838 | 19.9 | 19.9 | 0.00 | −6.00 | 2.39 | 6.4 | 1.04 | 11.5 | 5.4 | 71 | 21.1 | 87.6 |
| Ex. 4 | 0.113 | 20 | 19.2 | 0.80 | −10.00 | 2.39 | 42.3 | 37.5 | 14.5 | 4.8 | 66 | 21.1 | 80.1 |
| | 0.270 | 19.9 | 19.4 | 0.50 | −9.00 | 2.39 | 17.4 | 12.7 | 14.2 | 4.7 | 71 | 21.1 | 81.6 |
| | 0.600 | 19.9 | 19.8 | 0.10 | −6.00 | 2.39 | 8.5 | 3.4 | 11.5 | 5.1 | 72 | 21.1 | 84.1 |
| | 0.834 | 19.9 | 19.9 | 0.00 | −6.50 | 2.39 | 5.8 | 0.96 | 12 | 4.8 | 73 | 22.0 | 86.0 |
| Ex. 5 | 0.087 | 22 | 19.4 | 2.60 | 42.00 | 2.19 | 41.2 | 37.6 | 14.8 | 3.6 | 69 | 23.5 | 80.0 |
| | 0.260 | 19.9 | 19.6 | 0.30 | 42.00 | 2.13 | 16.9 | 12.5 | 14.4 | 4.4 | 75 | 23.1 | 81.5 |
| | 0.600 | 20 | 19.7 | 0.30 | 42.00 | 2.13 | 8.5 | 3.4 | 11 | 5.1 | 87 | 22.3 | 84.1 |
| | 0.847 | 19.8 | 19.8 | 0.00 | 47.50 | 2.1 | 6.4 | 0.98 | 11.2 | 5.4 | 92 | 21.3 | 85.9 |
| Ex. 6 | 0.090 | 22 | 19.4 | 2.60 | 42.00 | 2.19 | 41.2 | 37.5 | 15 | 3.7 | 86 | 23.5 | 80.0 |
| | 0.260 | 20 | 19.7 | 0.30 | 39.20 | 2.15 | 16.9 | 12.5 | 14.4 | 4.4 | 96 | 23.2 | 81.3 |
| | 0.600 | 20 | 19.9 | 0.10 | 42.00 | 2.14 | 8.5 | 3.4 | 11.5 | 5.1 | 97 | 22.3 | 83.4 |
| | 0.847 | 19.8 | 19.8 | 0.00 | 47.50 | 2.1 | 6.4 | 0.98 | 11 | 5.4 | 102 | 21.6 | 84.8 |

TABLE IV

| O$_2$/N$_2$ Selectivity | Stage Cut | Pressure | | | | | Flow | | | | Concentration | | |
|---|---|---|---|---|---|---|---|---|---|---|---|---|---|
| | | Feed (psig) | Retentate (psig) | Tube Drop (psig) | Shell (inches) water) | Pressure Ratio | Feed (scfm) | Retentate (scfm) | Total Shell (scfm) | Permeate (scfm) | Shell Temp. (° F.) | Permeate Oxygen (vol. %) | Retentate Nitrogen (vol. %) |
| | | | | | | | Drawing Ref. No. | | | | | | |
| 2.63 | | 56 | 62 | | 61 | | 55 | 64 | 69 | | 67 | 68 | 65 |
| Comp | 0.100 | 20.0 | 19.8 | 0.20 | −0.25 | 2.36 | 23.9 | 21.5 | — | 2.4 | 67 | 30.5 | 80.0 |
| Ex. 2 | 0.221 | 20.0 | 19.9 | 0.10 | 0.325 | 2.36 | 9.5 | 7.4 | — | 2.1 | 70 | 30.1 | 81.4 |
| | 0.561 | 20.0 | 19.9 | 0.10 | 0.375 | 2.35 | 5.7 | 2.5 | — | 3.2 | 73 | 23.7 | 84.4 |
| | 0.914 | 20.0 | 20.0 | 0.00 | 0.375 | 2.36 | 3.5 | 0.3 | — | 3.2 | 74 | 16.1 | 88.8 |
| Ex. 7 | 0.096 | 20.0 | 19.7 | 0.30 | −7.50 | 2.39 | 23.9 | 21.6 | 14.50 | 2.3 | 66 | 24.1 | 80.9 |
| | 0.263 | 19.9 | 19.7 | 0.20 | −7.50 | 2.39 | 10 | 7.37 | 13.50 | 2.6 | 69 | 23.6 | 83.2 |
| | 0.468 | 20.0 | 19.9 | 0.10 | −11.00 | 2.42 | 4.7 | 2.5 | 20.00 | 2.2 | 72 | 22.1 | 86.5 |
| | 0.932 | 20.0 | 20.0 | 0.00 | −12.00 | 2.43 | 3.3 | 0.225 | 18.50 | 3.1 | 71 | 21.2 | 88.3 |
| Ex. 8 | 0.100 | 20.0 | 19.8 | 0.20 | −6.75 | 2.39 | 23.9 | 21.5 | 14.60 | 2.4 | 67 | 24.3 | 80.8 |
| | 0.220 | 19.9 | 19.8 | 0.20 | −7.75 | 2.40 | 9.5 | 7.41 | 13.80 | 2.1 | 70 | 23.7 | 83.0 |
| | 0.544 | 20.0 | 19.9 | 0.10 | −12.00 | 2.43 | 5.7 | 2.6 | 19.50 | 3.1 | 69 | 22.0 | 86.0 |
| | 0.918 | 20.0 | 20.0 | 0.00 | −11.50 | 2.43 | 3.4 | 0.28 | 18.50 | 3.1 | 72 | 21.3 | 88.0 |
| Ex. 9 | 0.105 | 21.0 | 19.8 | 1.20 | 42.00 | 2.17 | 23.9 | 21.4 | 13.80 | 2.5 | 84 | 23.8 | 80.7 |
| | 0.232 | 19.9 | 19.7 | 0.20 | 42.00 | 2.13 | 9.5 | 7.3 | 14.00 | 2.2 | 76 | 23.3 | 82.9 |
| | 0.544 | 20.0 | 19.9 | 0.10 | 33.60 | 2.18 | 5.7 | 2.6 | 19.00 | 3.1 | 90 | 22.0 | 85.8 |
| | 0.915 | 20.0 | 20.0 | 0.00 | 33.60 | 2.18 | 3.3 | 0.28 | 18.50 | 3.0 | 92 | 21.2 | 88.3 |
| Ex. 10 | 0.109 | 20.5 | 19.8 | 0.70 | 42.00 | 2.15 | 23.9 | 21.3 | 13.50 | 2.6 | 87 | 23.6 | 80.7 |
| | 0.232 | 19.9 | 19.7 | 0.20 | 44.80 | 2.12 | 9.5 | 7.3 | 14.10 | 2.2 | 93 | 23.1 | 82.6 |
| | 0.544 | 20.0 | 19.9 | 0.10 | 32.20 | 2.19 | 5.7 | 2.6 | 19.00 | 3.1 | 99 | 22.0 | 85.3 |
| | 0.924 | 19.9 | 19.9 | 0.00 | 36.40 | 2.16 | 3.7 | 0.28 | 18.50 | 3.4 | 102 | 21.1 | 86.8 |

TABLE V

| O$_2$/N$_2$ Selectivity | Stage Cut | Pressure | | | | | Flow | | | | Concentration | | |
|---|---|---|---|---|---|---|---|---|---|---|---|---|---|
| | | Feed (psig) | Retentate (psig) | Tube Drop (psig) | Shell (inches) water) | Pressure Ratio | Feed (slpm)* | Retentate (slpm) | Total Shell (slpm) | Permeate (slpm) | Shell Temp. (° F.) | Permeate Oxygen (vol. %) | Retentate Nitrogen (vol. %) |
| | | | | | | | Drawing Ref. No. | | | | | | |
| 3.8 | | 56 | 62 | | 61 | | 55 | 64 | 69 | | 67 | 68 | 65 |
| Comp | 0.063 | 20 | 19.8 | 0.20 | 0 | 2.35 | 28 | 26.25 | — | 1.8 | 68 | 33 | 80.1 |
| Ex. 3 | 0.310 | 20 | 19.95 | 0.05 | 0 | 2.36 | 10 | 6.9 | — | 3.1 | 84 | 32.1 | 82.8 |
| | 0.483 | 20 | 20 | 0.00 | 0 | 2.36 | 6 | 3.1 | — | 2.9 | 90 | 30.5 | 86.4 |
| Ex. 11 | 0.046 | 20 | 19.9 | 0.10 | −8.00 | 2.40 | 28.3 | 27 | 7.00 | 1.3 | 69 | 20.9 | 81.1 |
| | 0.188 | 20 | 20 | 0.00 | −6.00 | 2.40 | 9.6 | 7.8 | 6.50 | 1.8 | 74 | 20.8 | 86.0 |
| | 0.458 | 20 | 20 | 0.00 | −6.50 | 2.40 | 5.9 | 3.2 | 5.70 | 2.7 | 80 | 20.9 | 88.9 |
| Ex. 12 | 0.092 | 20 | 19.9 | 0.10 | −8.12 | 2.40 | 28.9 | 26.25 | 7.00 | 2.7 | 70 | 20.9 | 81.1 |
| | 0.147 | 20 | 19.95 | 0.05 | −6.00 | 2.39 | 10.2 | 8.7 | 6.80 | 1.5 | 70 | 20.8 | 85.6 |
| | 0.483 | 20 | 20 | 0.00 | −6.20 | 2.40 | 6 | 3.1 | 5.80 | 2.9 | 73 | 20.9 | 88.9 |
| Ex. 13 | 0.092 | 20 | 19.8 | 0.20 | 28.00 | 2.20 | 28.5 | 26 | 6.00 | 2.5 | 83 | 21.5 | 82.0 |
| | 0.175 | 20 | 19.9 | 0.10 | 22.40 | 2.24 | 10.3 | 8.5 | 5.00 | 1.8 | 90 | 21.0 | 86.4 |
| | 0.492 | 20 | 20 | 0.00 | 25.00 | 2.23 | 5.9 | 3 | 5.20 | 2.9 | 97 | 21.5 | 88.6 |
| Ex. 14 | 0.101 | 20 | 19.9 | 0.10 | 28.00 | 2.21 | 28.6 | 25.7 | 5.50 | 2.9 | 101 | 21.3 | 82.1 |
| | 0.190 | 20 | 19.9 | 0.10 | 22.40 | 2.24 | 10.5 | 8.5 | 5.00 | 2.0 | 95 | 21.4 | 86.3 |
| | 0.483 | 20 | 20 | 0 | 22.40 | 2.24 | 6 | 3.1 | 5.00 | 2.9 | 99 | 20.9 | 89.0 |

*standard liters per minute

What is claimed is:

1. In a gas separation membrane method of enriching the concentration of nitrogen of ambient air utilizing a membrane module having an elongated shell defining a longitudinal axis, a plurality of membranes each comprising a microporous hollow fiber defining an outer surface and a lumen surface and having a nonporous layer selectively permeable to oxygen and nitrogen deposited on at least one of the outer surface and the lumen surface, the membranes being positioned within the elongated shell to form an elongated fiber bundle having terminal potted ends to join the fibers in parallel fluid communication defining a tube side volume within the lumen surfaces and defining a shell side volume outside the nonporous layer and within the shell between the potted ends, in which a feed gas of composition of ambient air is continuously introduced into one of either the tube side volume or the shell side volume thereby causing a permeate gas flow through the membranes to a permeate volume and leaving a retentate gas of composition enriched in nitrogen relative to concentration of nitrogen of the feed gas, the improvement comprises introducing into the one of either the tube side volume or shell side volume the feed gas free of any recycled gas and feeding a sweep flow of the feed gas into the permeate volume at a rate effective to produce in a single stage separation, retentate gas having a concentration of nitrogen in the range of 80–90 vol. %.

2. The gas separation membrane method of claim 1 in which the improvement further comprises using a membrane having an oxygen/nitrogen selectivity in the range of about 1.9–3.8 and controlling rates of flow of feed gas and permeate gas to achieve a stage cut in the range of about 0.1 to about 0.9.

3. The gas separation membrane method of claim 2 in which the improvement further comprises maintaining sweep flow at about 10–150% of the rate of flow of feed gas.

4. The gas separation membrane of claim 1 in which the improvement further comprises aspirating sweep flow into the membrane module in a direction countercurrent to the flow of feed gas.

5. The gas separation membrane of claim 1 in which the improvement further comprises aspirating sweep flow into the membrane module in a direction cocurrent to the flow of feed gas.

6. The gas separation membrane of claim 1 in which the improvement further comprises blowing sweep flow into the membrane module in a direction countercurrent to the flow of feed gas.

7. The gas separation membrane of claim 1 in which the improvement further comprises blowing sweep flow into the membrane module in a direction cocurrent to the flow of feed gas.

8. A method of increasing the concentration of nitrogen in air comprising
providing a membrane module having
an elongated shell defining a longitudinal axis,
a plurality of membranes selectively gas permeable for oxygen and nitrogen positioned within the elongated shell, the membranes comprising (i) a microporous hollow fiber having a pore size of about 0.005–1.0 $\mu$m, (ii) an outer surface, (iii) a lumen defining a lumen surface, and (iv) a nonporous layer of a selectively gas permeable polymer less preferentially permeable for nitrogen than for oxygen deposited onto at least one of the outer surface and the lumen surface, in which the hollow fibers are positioned to form an elongated fiber bundle having terminal potted ends which connect the lumina in parallel fluid communication to define a tube side zone within the lumina and a shell side zone outside the nonporous layer and within the shell between the potted ends,
a plurality of shell side ports operative to conduct gas to or from the shell side zone,
a tube side inlet port operative to introduce gas into one end of the tube side zone, and
a tube side outlet port operative to withdraw gas from the other end of the tube side zone,
supplying a feed of air having a composition of about 79 vol. % nitrogen and about 21 vol. % oxygen to a first shell side port,
contacting one side of the membranes with the feed of air, thereby causing oxygen and nitrogen to permeate the membranes to produce a retentate gas mixture in contact with the one side of the membranes having a first concentration of nitrogen, and a permeate gas mixture in contact with the opposite side of the membranes,
introducing through the tube side inlet port and into the permeate gas mixture a sweep flow of the feed of air at a rate effective to produce a second concentration of nitrogen of about 80–90 vol. % in the retentate gas mixture and higher than the first concentration,
withdrawing the retentate gas mixture from a second shell side port, and
withdrawing the permeate gas mixture from the tube side outlet port,
in which said second concentration is produced in a single stage membrane separation.

9. The method of claim 8 in which the first shell side port is positioned proximate to the tube side inlet port, the second shell side port is positioned proximate to the tube side outlet port, and the method further comprises blowing the sweep flow into the tube side zone.

10. The method of claim 8 in which the first shell side port is positioned proximate to the tube side inlet port, the second shell side port is positioned proximate to the tube side outlet port, and the method further comprises drawing the permeate gas mixture from the tube side zone under suction, thereby drawing sweep flow into the tube side zone.

11. The method of claim 8 in which the first shell side port is positioned proximate to the tube side outlet port, the second shell side port is positioned proximate to the tube side inlet port, and the method further comprises blowing the sweep flow into the tube side zone.

12. The method of claim 8 in which the first shell side port is positioned proximate to the tube side outlet port, the second shell side port is positioned proximate to the tube side inlet port, and the method further comprises drawing the permeate gas mixture from the tube side zone under suction, thereby drawing sweep flow into the tube side zone.

13. A method of increasing the concentration of nitrogen in air comprising
providing a membrane module having
an elongated shell defining a longitudinal axis,
a plurality of membranes selectively gas permeable for oxygen and nitrogen positioned within the elongated shell, the membranes comprising (i) a microporous hollow fiber having a pore size of about 0.005–1.0 $\mu$m, (ii) an outer surface, (iii) a lumen defining a lumen surface, and (iv) a nonporous layer of a selectively gas permeable polymer less preferentially permeable for nitrogen than for oxygen deposited onto at least one of the outer surface and the lumen surface, in which the hollow fibers are positioned to form an elongated fiber bundle having terminal potted ends which connect the lumina in parallel fluid communication to define a tube side zone within the lumina and a shell side zone outside the nonporous layer and within the shell between the potted ends,
a plurality of shell side ports operative to conduct gas to or from the shell side zone,
a tube side inlet port operative to introduce gas into one end of the tube side zone, and
a tube side outlet port operative to withdraw gas from the other end of the tube side zone,
supplying a feed of air having a composition of about 79 vol. % nitrogen and about 21 vol. % oxygen to the tube side inlet port,
contacting one side of the membranes with the feed of air, thereby causing oxygen and nitrogen to permeate the membranes to produce a retentate gas mixture in contact with the one side of the membranes having a first concentration of nitrogen, and a permeate gas mixture in contact with the opposite side of the membranes,
introducing through a first shell side port and into the permeate gas mixture a sweep flow of the feed of air at a rate effective to produce a second concentration of nitrogen of about 80–90 vol. % in the retentate gas mixture and higher than the first concentration,
withdrawing the retentate gas mixture from the tube side outlet, and
withdrawing the permeate gas mixture from a second shell side port, in which said second concentration is produced in a single stage membrane separation.

14. The method of claim 13 in which the first shell side port is positioned proximate to the tube side inlet port, the second shell side port is positioned proximate to the tube side outlet port, and the method further comprises blowing the sweep flow into the shell side zone.

15. The method of claim 13 in which the first shell side port is positioned proximate to the tube side inlet port, the second shell side port is positioned proximate to the tube side outlet port, and the method further comprises drawing the permeate gas mixture from the shell side zone under suction, thereby drawing sweep flow into the shell side zone.

16. The method of claim 13 in which the first shell side port is positioned proximate to the tube side outlet port, the second shell side port is positioned proximate to the tube side inlet port, and the method further comprises blowing the sweep flow into the shell side zone.

17. The method of claim 13 in which the first shell side port is positioned proximate to the tube side outlet port, the second shell side port is positioned proximate to the tube side inlet port, and the method further comprises drawing the permeate gas mixture from the shell side zone under suction, thereby drawing sweep flow into the shell side zone.

* * * * *

UNITED STATES PATENT AND TRADEMARK OFFICE
CERTIFICATE OF CORRECTION

PATENT NO. : 6,478,852 B1
DATED : November 12, 2002
INVENTOR(S) : Kevin P. Callaghan and Stuart M. Nemser It is certified that error appears in the above-identified patent and that said Letters Patent is hereby corrected as shown below:

<u>Column 17,</u>
Lines 7, 11, 14 and 19, insert -- method -- after "membrane".

Signed and Sealed this

Eighteenth Day of March, 2003

JAMES E. ROGAN
*Director of the United States Patent and Trademark Office*